US012031673B2

(12) United States Patent
Kataoka et al.

(10) Patent No.: US 12,031,673 B2
(45) Date of Patent: Jul. 9, 2024

(54) METHOD FOR MANUFACTURING TANK UNIT

(71) Applicant: TOYOTA JIDOSHA KABUSHIKI KAISHA, Toyota (JP)

(72) Inventors: Chiaki Kataoka, Nagakute (JP); Osamu Sawai, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 2 days.

(21) Appl. No.: 17/931,983

(22) Filed: Sep. 14, 2022

(65) Prior Publication Data

US 2023/0103573 A1 Apr. 6, 2023

(30) Foreign Application Priority Data

Oct. 4, 2021 (JP) ................................ 2021-163387

(51) Int. Cl.
*F17C 1/00* (2006.01)

(52) U.S. Cl.
CPC ........ *F17C 1/00* (2013.01); *F17C 2201/0109* (2013.01); *F17C 2201/035* (2013.01); *F17C 2201/056* (2013.01); *F17C 2205/0107* (2013.01); *F17C 2205/0142* (2013.01); *F17C 2209/22* (2013.01); *F17C 2221/012* (2013.01); *F17C 2223/035* (2013.01); *F17C 2270/0178* (2013.01); *F17C 2270/0184* (2013.01)

(58) Field of Classification Search
CPC . G01M 3/36; G01M 3/022; F17C 2205/0142; F17C 2270/0184; F17C 1/00; B29C 65/8246
USPC ........................................................ 134/95.2
See application file for complete search history.

(56) References Cited

U.S. PATENT DOCUMENTS

| | | | | |
|---|---|---|---|---|
| 3,230,760 | A * | 1/1966 | Fryer, Jr. | G01N 3/12 73/37 |
| 3,926,036 | A * | 12/1975 | Bower | G01M 3/02 134/169 R |
| 4,294,271 | A * | 10/1981 | Intrater | B08B 9/027 134/169 C |
| 10,641,433 | B2 * | 5/2020 | Ogiwara | B60K 15/03006 |
| 10,717,356 | B2 | 7/2020 | Kataoka et al. | |
| 2009/0095322 | A1 * | 4/2009 | Wakao | B08B 9/34 134/135 |
| 2019/0047411 | A1 | 2/2019 | Kataoka et al. | |
| 2021/0237562 | A1 | 8/2021 | Sawai | |
| 2023/0058291 | A1 | 2/2023 | Criel et al. | |

FOREIGN PATENT DOCUMENTS

| | | | |
|---|---|---|---|
| JP | 2014119292 | A | 6/2014 |
| JP | 2019033657 | A | 2/2019 |
| JP | 2021124171 | A | 8/2021 |
| WO | 2021110707 | A1 | 6/2021 |

* cited by examiner

*Primary Examiner* — Kenneth Rinehart
*Assistant Examiner* — Nicole Gardner
(74) *Attorney, Agent, or Firm* — Hunton Andrews Kurth LLP

(57) ABSTRACT

A method for manufacturing a tank unit includes performing a pressure resistance inspection on each of a plurality of high pressure tanks before connecting the high pressure tanks, and connecting a gas flow path to the high pressure tanks that have passed the pressure resistance inspection.

2 Claims, 13 Drawing Sheets

METHOD FOR MANUFACTURING TANK UNIT

CROSS-REFERENCE TO RELATED APPLICATION

This application claims priority to Japanese Patent Application No. 2021-163387 filed on Oct. 4, 2021, incorporated herein by reference in its entirety.

BACKGROUND

1. Technical Field

The technique disclosed in the present specification relates to methods for manufacturing a tank unit in which a plurality of high pressure tanks is connected.

2. Description of Related Art

Japanese Unexamined Patent Application Publication No. 2019-033657 (JP 2019-033657 A) discloses a tank unit in which a plurality of high pressure tanks is connected. The tank unit of JP 2019-033657 A is a tank unit filled with hydrogen gas and is mounted on a fuel cell electric vehicle. The high pressure tanks are connected by connecting members. The connecting member also serves as a pipe for guiding the gas in the high pressure tanks to the outside. The high pressure tanks are housed in a case.

Japanese Unexamined Patent Application Publication No. 2021-124171 (JP 2021-124171 A) also discloses a tank unit. A high pressure tank has an elongated cylindrical shape, and a plurality of high pressure tanks is arranged in parallel. The tops and bottoms of the high pressure tanks are connected by connectors.

Japanese Unexamined Patent Application Publication No. 2014-119292 (JP 2014-119292 A) discloses a pressure resistant test for a high pressure tank.

SUMMARY

The technique disclosed in the present specification provides a method for efficiently manufacturing a tank unit in which a plurality of high pressure tanks is connected.

A method for manufacturing a tank unit disclosed in the present specification includes: performing a pressure resistance inspection on each of a plurality of high pressure tanks before connecting the high pressure tanks; and a connecting a gas flow path to the high pressure tanks that have passed the pressure resistance inspection. The gas flow path is thinner than a pipe of a water injection device that injects a liquid into the high pressure tanks. Therefore, if water is injected into the high pressure tank for the pressure resistance inspection after the gas flow path is attached to the high pressure tank, it takes time to perform the pressure resistance inspection due to large loss in the gas flow path. The tank unit can be efficiently manufactured by performing the pressure resistance inspection on the high pressure tanks before attaching the gas flow path to the high pressure tanks.

Each of the high pressure tanks may have an opening in a top and a bottom of each of the high pressure tanks. The opening in the bottom may be sealed with a plug and a liquid may be injected through the opening in the top into each of the high pressure tanks to perform the pressure resistance inspection. In this case, after the plug is removed and inside of each of the high pressure tanks is dried, an end cap may be attached to the opening in the bottom, and the end cap of each of the high pressure tanks may be fitted in a bottom connector to connect the high pressure tanks.

Dry air having entered the high pressure tank through the opening in the top passes through the inside of the high pressure tank and leaves the high pressure tank through the opening in the bottom. Since the dry air can be passed through the inside of the high pressure tank in one direction, the inside of the high pressure tank can be dried quickly.

The tops of the high pressure tanks may be connected by a top connector when connecting a gas flow path to the high pressure tanks, and all the high pressure tanks may be contained in a smallest rectangular parallelepiped containing the bottom connector and the top connector. The top connector and the bottom connector can protect all the high pressure tanks.

Details of the technique disclosed in the present specification and further improvements will be described in the "DETAILED DESCRIPTION OF EMBODIMENTS" below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
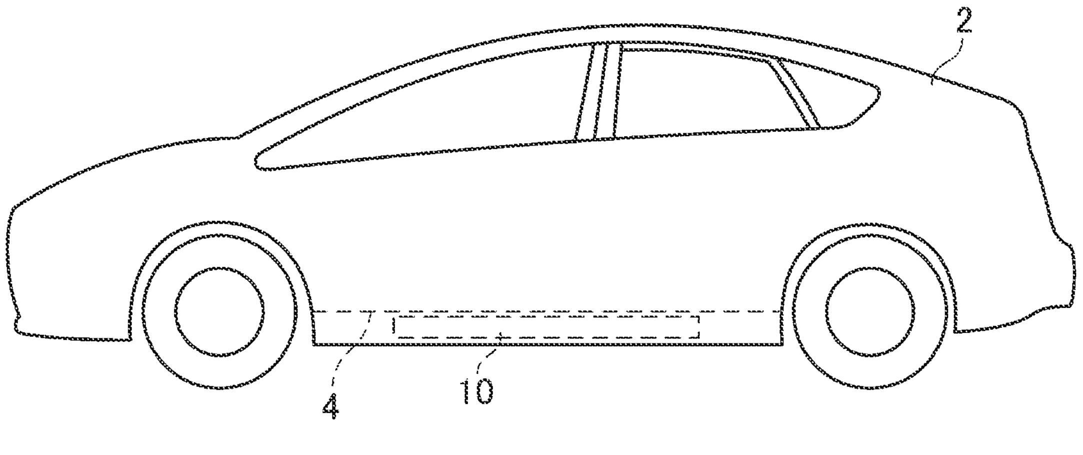
FIG. 1 is a side view of a fuel cell electric vehicle equipped with a tank unit of an embodiment.

A tank unit 10 of an embodiment will be described with reference to the drawings. The tank unit 10 is mounted on a fuel cell electric vehicle. The tank unit 10 supplies hydrogen gas to a fuel cell stack of the fuel cell electric vehicle. FIG. 1 is a side view of a fuel cell electric vehicle 2 equipped with the tank unit 10. The tank unit 10 is fixed under a floor panel 4.

Figure 2:
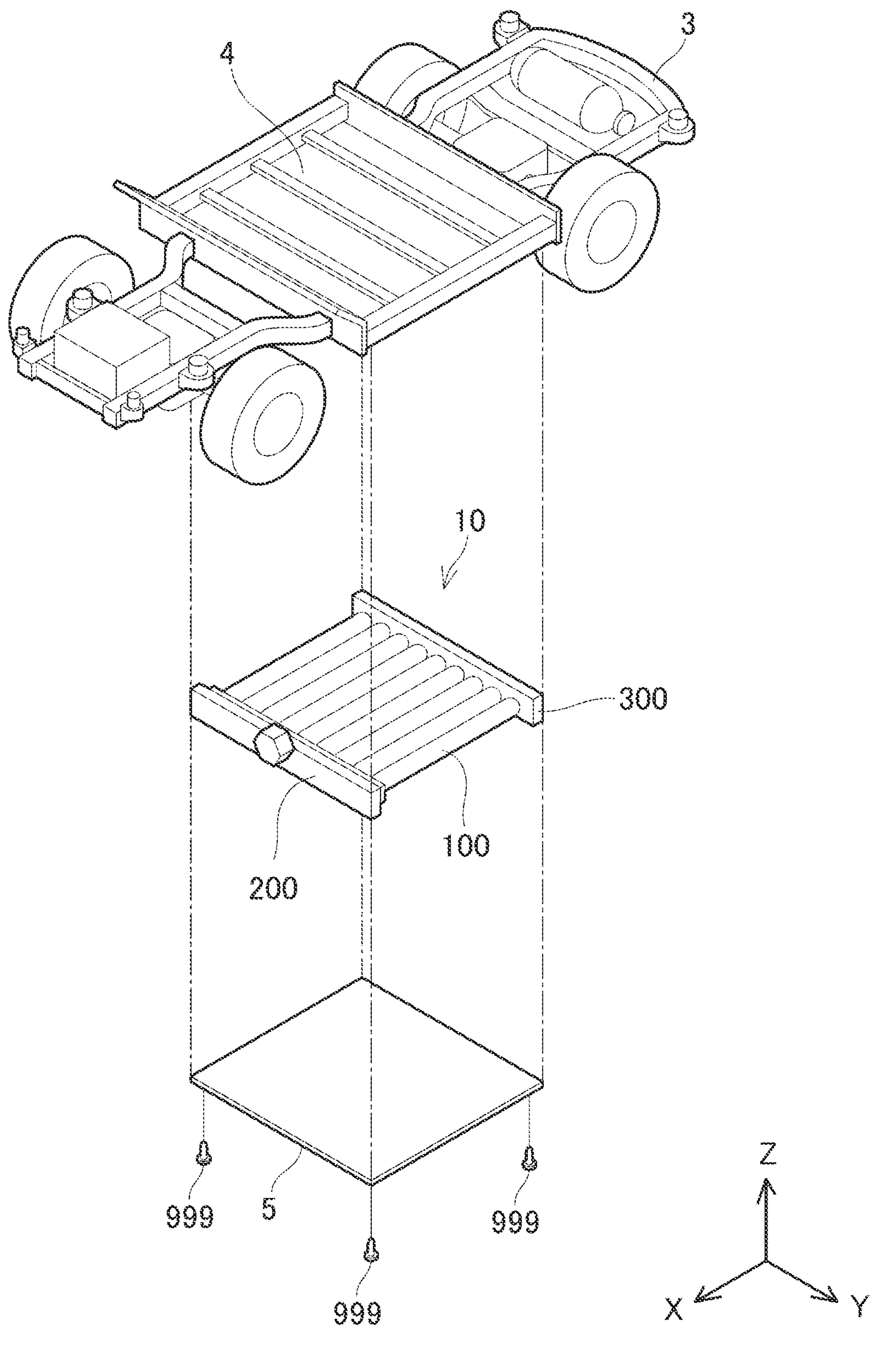
FIG. 2 is a perspective view of the tank unit.

FIG. 2 is a perspective view of the tank unit 10 separated from a chassis 3 of the fuel cell electric vehicle 2. The tank unit 10 includes a plurality of high pressure tanks 100. The high pressure tanks 100 are connected by a top connector 200 and a bottom connector 300. In FIG. 2, only one of the high pressure tanks 100 is denoted by the reference sign 100, and the reference sign 100 is omitted for the other high pressure tanks.

The tank unit 10 is fixed to the lower surface of the floor panel 4 with bolts 999. A protector 5 is placed under the tank unit 10. The protector 5 protects the tank unit 10 from stones tossed up during traveling.

Figure 3:
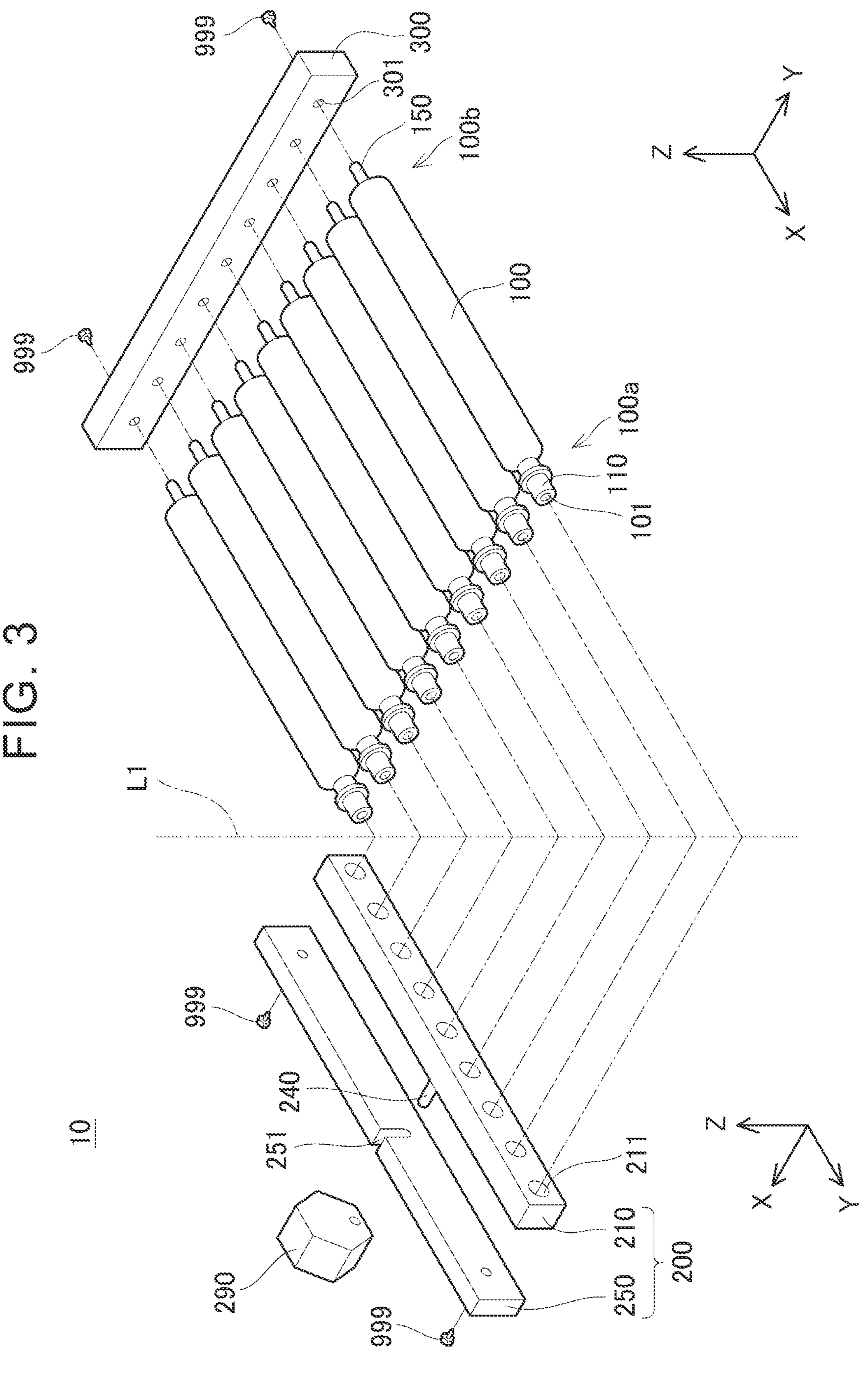
FIG. 3 is an exploded perspective view of the tank unit.
Figure 4:
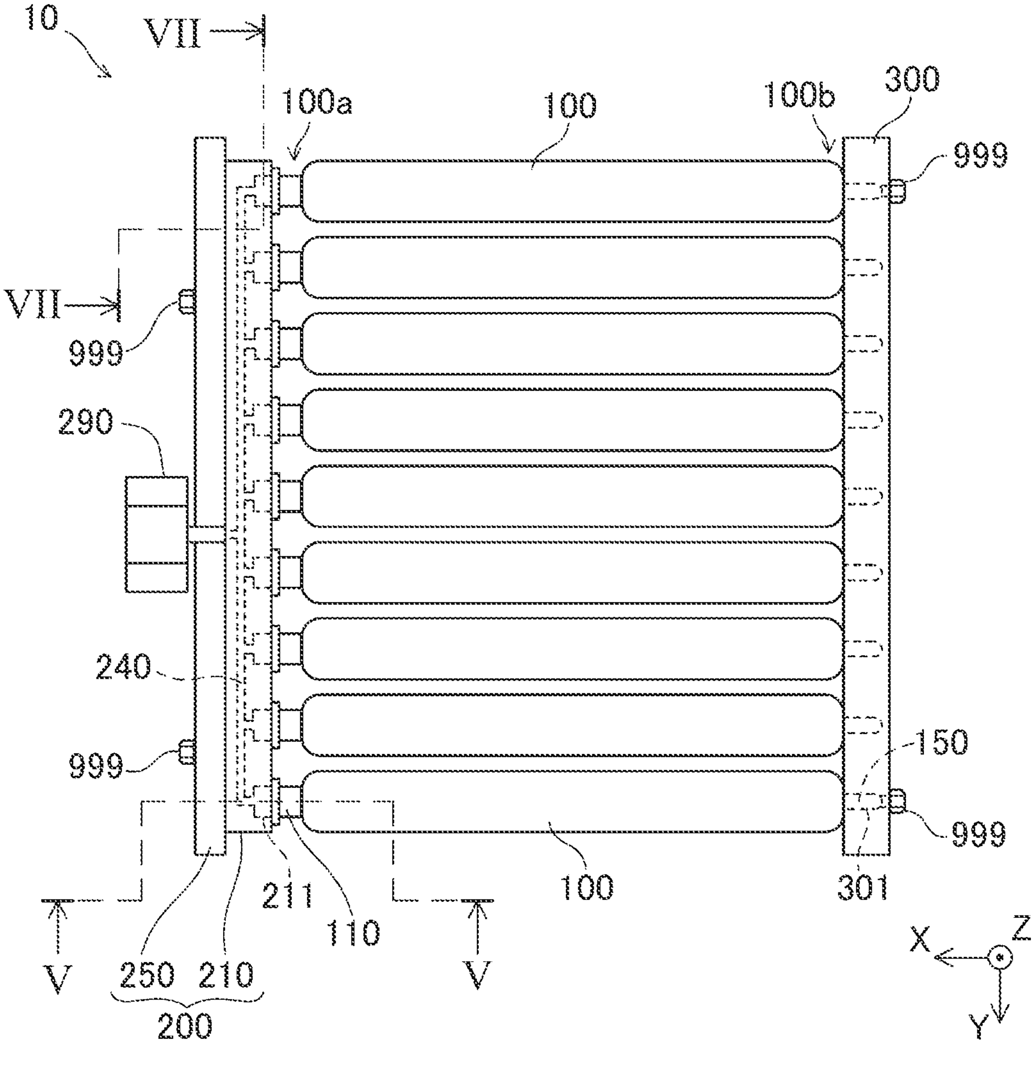
FIG. 4 is a plan view of the tank unit.

FIG. 3 is an exploded perspective view of the tank unit 10. FIG. 4 is a plan view of the tank unit 10. In order to facilitate understanding, the orientation of the coordinate system is made different between the right and left sides of a straight line L1 in FIG. 3.

The high pressure tank 100 has a long cylindrical shape. For convenience of explanation, one end in the axial direction of the high pressure tank 100 is referred to as "top 100*a*," and the other end in the axial direction of the high pressure tank 100 is referred to as "bottom 100*b*." The high pressure tank 100 has an opening 101 in the top 100*a*. The tank unit 10 includes a plurality of high pressure tanks 100, and the high pressure tanks 100 are arranged in parallel with both a plurality of tops 100*a* and a plurality of bottoms 100*b* aligned with each other. The tops 100*a* of the high pressure tanks 100 are connected by the top connector 200, and the bottoms 100*b* of the high pressure tanks 100 are connected by the bottom connector 300.

A boss 110 is attached to the top 100*a*. A main body of the high pressure tank 100 is made of carbon fiber-reinforced plastic, and the boss 110 is made of metal. The boss 110 is a joint for connecting the high pressure tank 100 to the top connector 200. The boss 110 is a part of the high pressure tank 100.

The top connector 200 includes a protector 250 and an intake manifold 210. The intake manifold 210 includes a gas flow path 240 and a plurality of caps 211, and each of the caps 211 is connected to the boss 110 of a corresponding one of the high pressure tanks 100. The cap 211 closes the opening 101 in the top 100*a* of the high pressure tank 100. The inside of the caps 211 communicates with the gas flow path 240. That is, the gas flow path 240 is open to the inside of each cap 211.

One end of the gas flow path 240 extends from the intake manifold 210 in the X direction of the coordinate system in the figure. The one end of the gas flow path 240 passes through a groove 251 in the protector 250 and is connected to a main stop valve 290. When the caps 211 are attached to the openings (bosses 110) of the high pressure tanks 100, the openings 101 of the high pressure tanks 100 communicate with the gas flow path 240. The gas flow path 240 guides the gas in the high pressure tanks 100 to the outside.

The intake manifold 210 is connected to the protector 250 with bolts 999. The protector 250 is made of high strength steel. The protector 250 connects the high pressure tanks 100 and protects the high pressure tanks 100.

The high pressure tank 100 also has an opening in the bottom 100*b*, and the opening in the bottom 100*b* of the high pressure tank 100 is closed by an end cap 150. The end cap 150 attached to the high pressure tank 100 protrudes outward from the bottom 100*b* of the high pressure tank 100. The bottom connector 300 has a plurality of holes 301, and the end caps 150 of the high pressure tanks 100 are inserted the holes 301. The high pressure tanks 100 are also bundled by the bottom connector 300. Two or more of the high pressure tanks 100 are fixed to the bottom connector 300 with bolts 999 via the end caps 150. Since two or more of the high pressure tanks 100 are fixed to the bottom connector 300, the remainder of the high pressure tanks 100 will not come off from the bottom connector 300.

Figure 5:
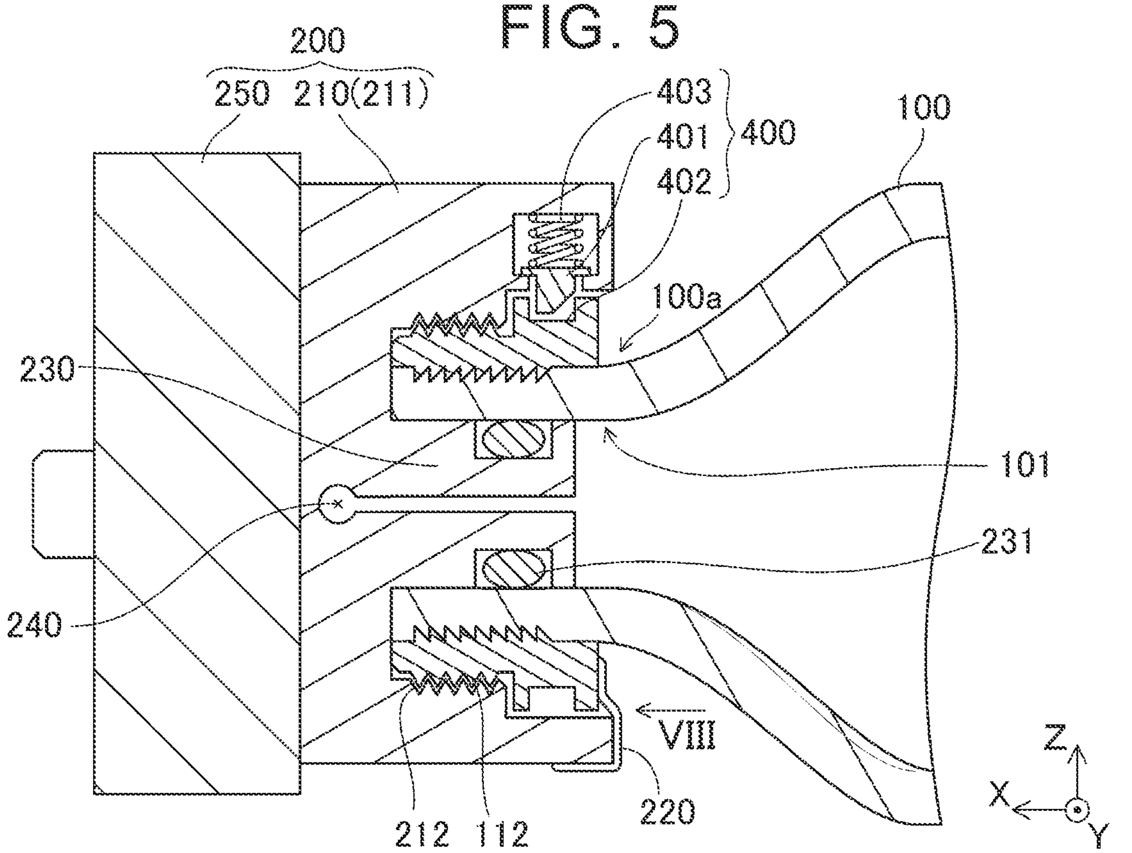
FIG. 5 is a sectional view of the tank unit taken along line V-V in FIG. 4.

FIG. 5 is a sectional view taken along line V-V in FIG. 4. FIG. 5 shows an example of a connection structure between the opening 101 of the high pressure tank 100 and the cap 211. The boss 110 is press-fitted on the top 100*a* of the high pressure tank 100. The boss 110 has threads 112 on its outer periphery (that is, the outer periphery of the top 100*a* of the high pressure tank 100), and the cap 211 has thread grooves 212 on its inner peripheral surface. The high pressure tank 100 (boss 110) can be screwed into the cap 211. The threads 112 of the boss 110 engage with the thread grooves 212 of the cap 211, so that the high pressure tank 100 is connected to the cap 211.

The boss 110 has a lock groove 402 on the outer periphery of its rear end. The lock groove 402 extends along the entire circumference of the rear end of the boss 110. A lock pin 401 that advances and withdraws with respect to the boss 110 is provided on the inner side surface of the cap 211. The lock pin 401 is attached to the cap 211 so that the lock pin 401 can advance and withdraw with respect to the side surface of the boss 110. The lock pin 401 is biased toward the boss 110 by a spring 403.

Figure 6:
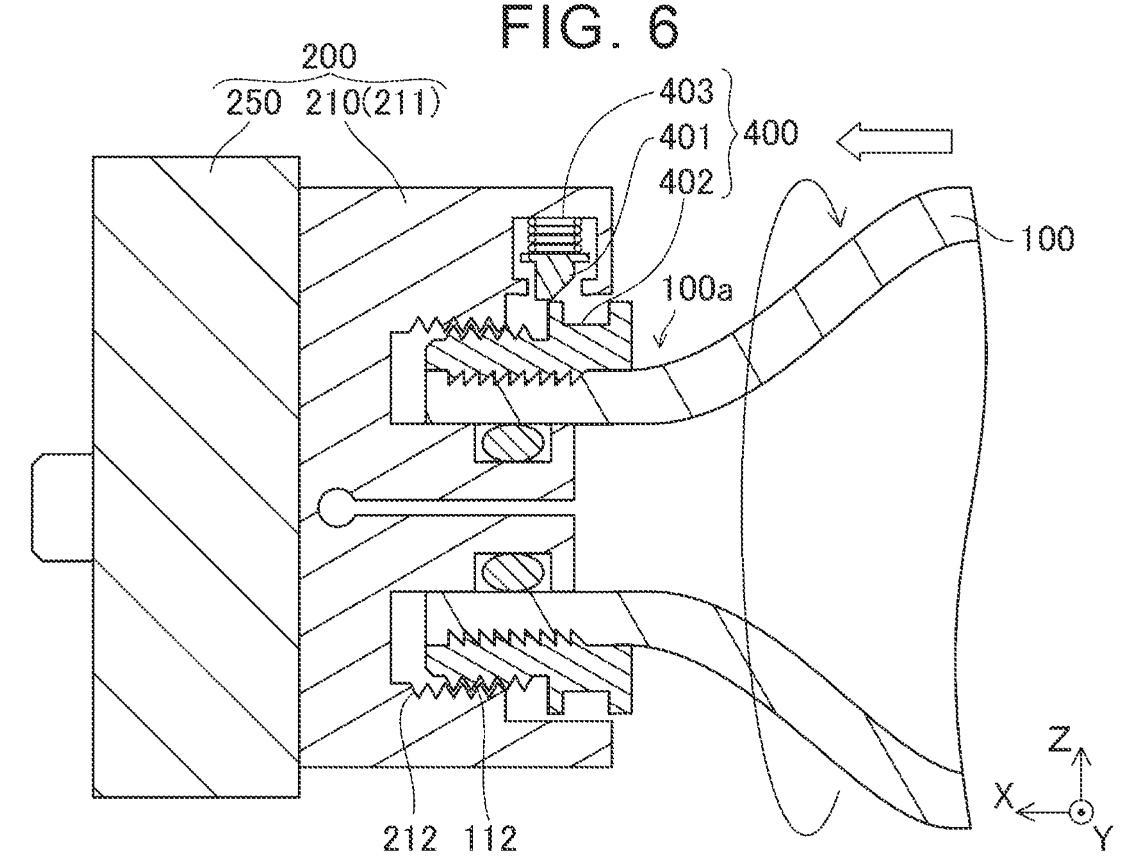
FIG. 6 is a sectional view of a high pressure tank that is being attached to a cap.

One side surface of the lock pin 401 (the side surface on the opening side of the cap 211) is tilted, and the opposite side surface of the lock pin 401 is perpendicular to the inner surface of the cap 211. FIG. 6 shows the boss 110 (top 100*a* of the high pressure tank 100) being screwed into the cap 211. As the high pressure tank 100 is inserted into the cap 211, the lock pin 401 is pushed by the boss 110 and withdraws (FIG. 6). When the boss 110 enters the cap 211 and the lock groove 402 faces the lock pin 401, the lock pin 401 is engaged with the lock groove 402 by the spring 403 (FIG. 5). Once the lock pin 401 is engaged with the lock groove 402, the boss 110 (high pressure tank 100) will not come off from the cap 211. The lock pin 401, the lock groove 402, and the spring 403 form a lock mechanism 400 that locks the high pressure tank 100 so that the high pressure tank 100 will not come off from the cap 211.

A stopper 230 is provided inside the cap 211. The stopper 230 is a part of the intake manifold 210. The stopper 230 enters the opening 101 of the high pressure tank 100. The gas flow path 240 also leads to the inside of the stopper 230. As described above, the gas flow path 240 is open to the inside of the cap 211 (stopper 230). When the high pressure tank 100 is connected to the cap 211, the high pressure tank 100 and the main stop valve 290 communicate with each other through the gas flow path 240.

Figure 7:
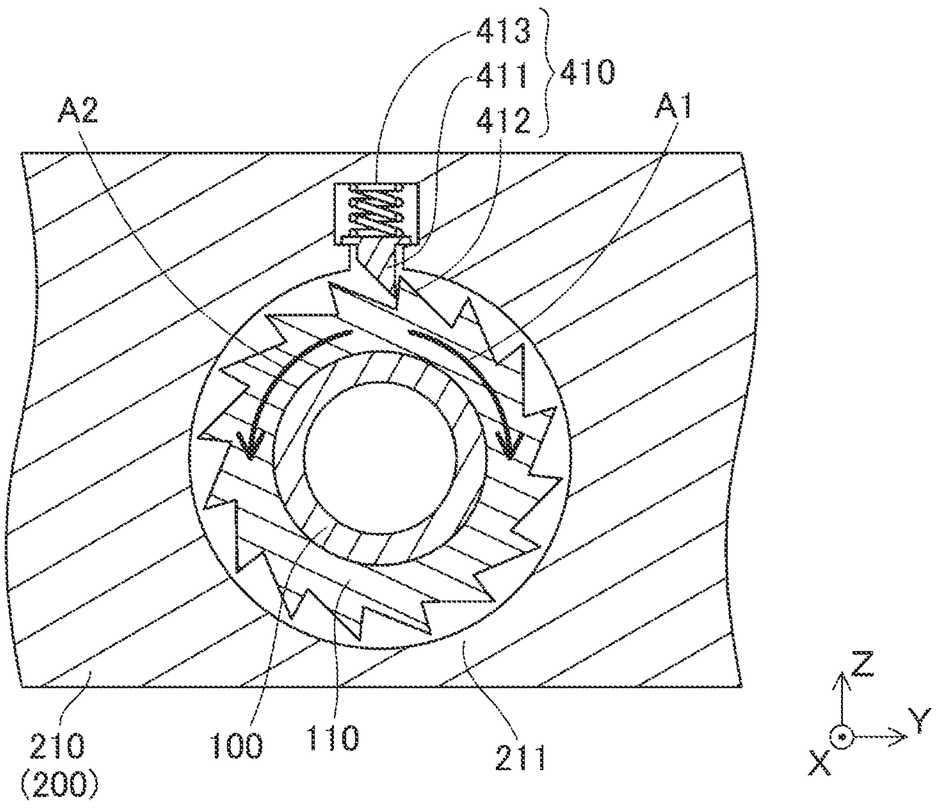
FIG. 7 is a sectional view of the tank unit taken along line VII-VII in FIG. 4.

Another configuration example of the lock mechanism will be described. FIG. 7 is a sectional view taken along line VII-VII in FIG. 4. FIGS. 5 and 6 show an example of the lock mechanism 400. FIG. 7 shows another example of the lock mechanism (lock mechanism 410).

Although not visible in FIG. 7, in the lock mechanism 410 as well, the boss 110 has threads 112 on its outer peripheral surface and the cap 211 has thread grooves 212 on its inner peripheral surface as in the case of FIGS. 5 and 6. The threads 112 of the high pressure tank 100 engage with the thread grooves 212 of the cap 211, so that the high pressure tank 100 is fixed to the cap 211. A gear 412 is formed at the root of the boss 110 of the high pressure tank 100. The cap 211 is provided with a lock pin 411 that advances and withdraws with respect to the boss 110, and a spring 413 that biases the lock pin 411 toward the boss 110.

The lock pin 411, the spring 413, and the gear 412 form a ratchet structure that allows rotation of the high pressure tank 100 in the direction of arrow A1 but prohibits rotation of the high pressure tank 100 in the reverse direction (direction of arrow A2). As shown in FIG. 7, the boss 110 (high pressure tank 100) with the gear 412 is rotatable in the direction of the arrow A1, but the rotation of the boss 110 in the direction of the arrow A2 (reverse rotation) is prevented by the gear 412, the lock pin 411, and the spring 413. The lock mechanism 410 (structure of FIG. 7) using a ratchet structure also locks the high pressure tank 100 so that the high pressure tank 100 will not come off from the cap 211.

Figure 8:
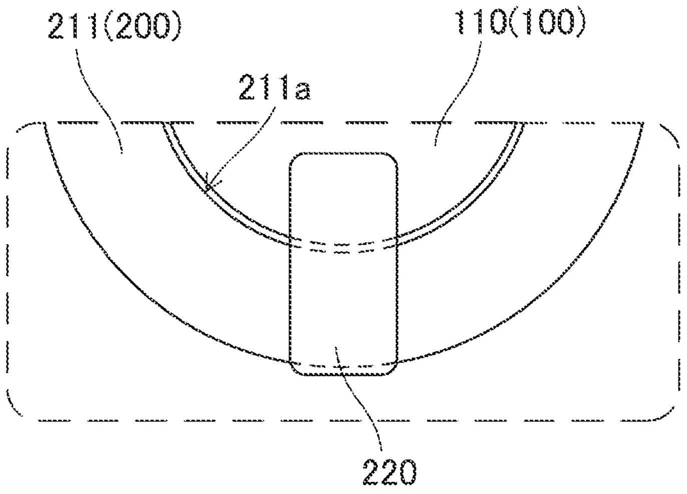
FIG. 8 is an enlarged view as viewed in the direction of arrow VIII in FIG. 5.

FIG. 8 is a plan view as viewed in the direction of arrow VIII in FIG. 5. FIG. 8 is an enlarged view of near the boundary between an opening edge 211*a* of the cap 211 and the high pressure tank 100 (boss 110). A tally impression (tally seal) 220 is attached to the boundary between the cap 211 (opening edge 211*a*) and the high pressure tank 100 (boss 110). The tally impression 220 is attached after the high pressure tank 100 is attached to the cap 211. FIG. 6 shows the high pressure tank 100 that is being attached to the cap 211, and the tally impression 220 has not been attached yet.

Since the high pressure tank 100 is provided with the lock mechanism 400, 410, the high pressure tank 100 will not easily come off from the cap 211. However, even if the high pressure tank 100 came off from the cap 211 by some accident and was reconnected to the cap 211, it would be obvious at a glance that the high pressure tank 100 came off from the cap 211 in the past because the tally impression 220 is broken. The tally impression 220 can be a sticker or a stamp.

As described above, the tank unit 10 includes the high pressure tanks 100, the top connector 200, and the bottom connector 300. The high pressure tanks 100 are long, and are arranged in parallel with both the tops 100*a* and the bottoms 100*b* aligned with each other. The top connector 200 connects the tops 100*a* of the high pressure tanks 100, and the bottom connector 300 connects the bottoms 100*b* of the high pressure tanks 100.

Figure 9:
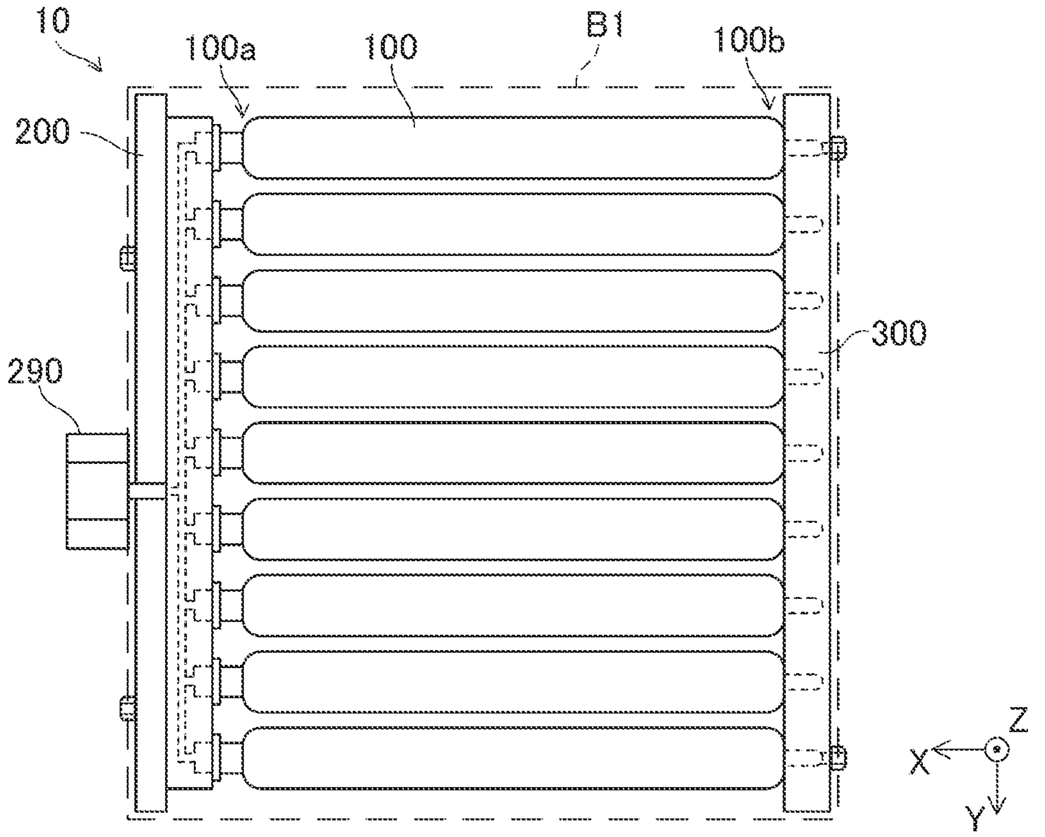
FIG. 9 is a plan view of the tank unit.
Figure 10:
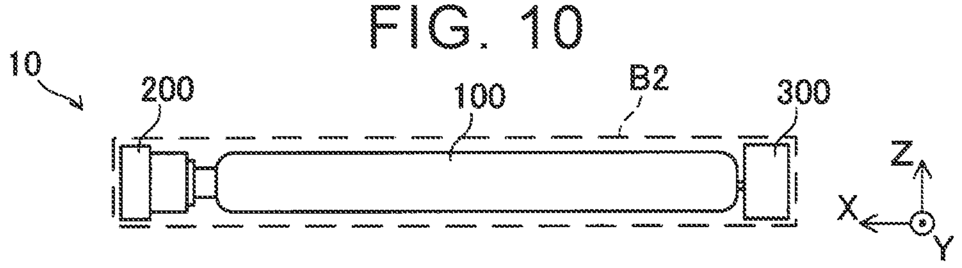
FIG. 10 is a side view of the tank unit.

The plan view of the tank unit 10 is shown again in FIG. 9. A dashed rectangle B1 is the smallest rectangle containing the top connector 200 and the bottom connector 300. All the high pressure tanks 100 are located inside the dashed rectangle B1. FIG. 10 shows a side view of the tank unit 10. A dashed rectangle B2 in FIG. 10 is the smallest rectangle containing the top connector 200 and the bottom connector 300 when viewed from the side. All the high pressure tanks 100 are located inside the dashed rectangle B2. The main stop valve 290 is not shown in FIG. 10 and FIGS. 11 and 12 that will be described later.

Figure 11:
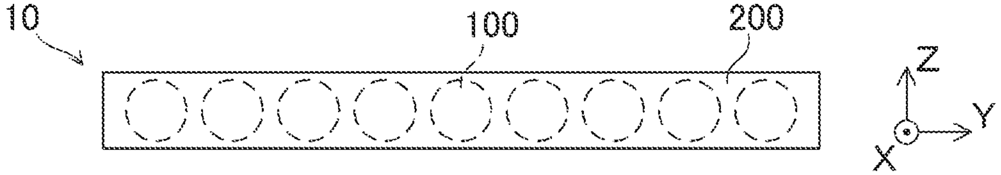
FIG. 11 shows the tank unit as viewed from the tops of high pressure tanks.
Figure 12:
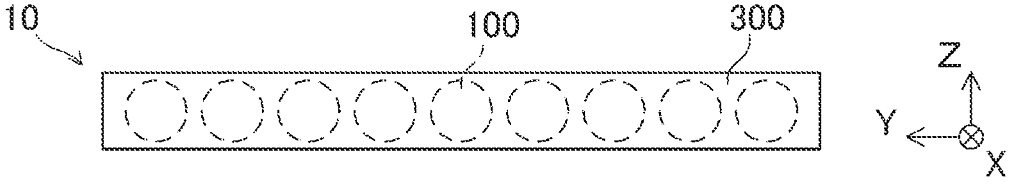
FIG. 12 shows the tank unit as viewed from the bottoms of the high pressure tanks.

FIG. 11 shows the tank unit 10 as viewed from the tops of the high pressure tanks 100. All the high pressure tanks 100 are located inside the contour of the top connector 200 when viewed from the tops of the high pressure tanks 100. FIG. 12 shows the tank unit 10 as viewed from the bottoms of the high pressure tanks 100. All the high pressure tanks 100 are located inside the contour of the bottom connector 300 when viewed from the bottoms of the high pressure tanks 100.

As shown in FIGS. 9 to 12, the tank unit 10 has the following features. All the high pressure tanks 100 are located inside the contour of the top connector 200 and inside the contour of the bottom connector 300 when viewed in a tank longitudinal direction (X direction in the figures) connecting the top 100*a* and bottom 100*b* of the high pressure tank 100 (FIGS. 11 and 12). All the high-pressure tanks 100 are located inside the contour containing the top connector 200 and the bottom connector 300 (dashed rectangles B1, B2) when viewed in the direction in which the high pressure tanks 100 are arranged (Y direction in the figures) and when viewed in plan in the direction (Z direction) crossing the tank longitudinal direction (X direction) and the direction in which the high pressure tanks 100 are arranged (Y direction). In other words, one structural feature of the tank unit 10 can be described as follows. All the high pressure tanks 100 are located in the smallest rectangular parallelepiped containing the top connector 200 and the bottom connector 300.

Figure 13:
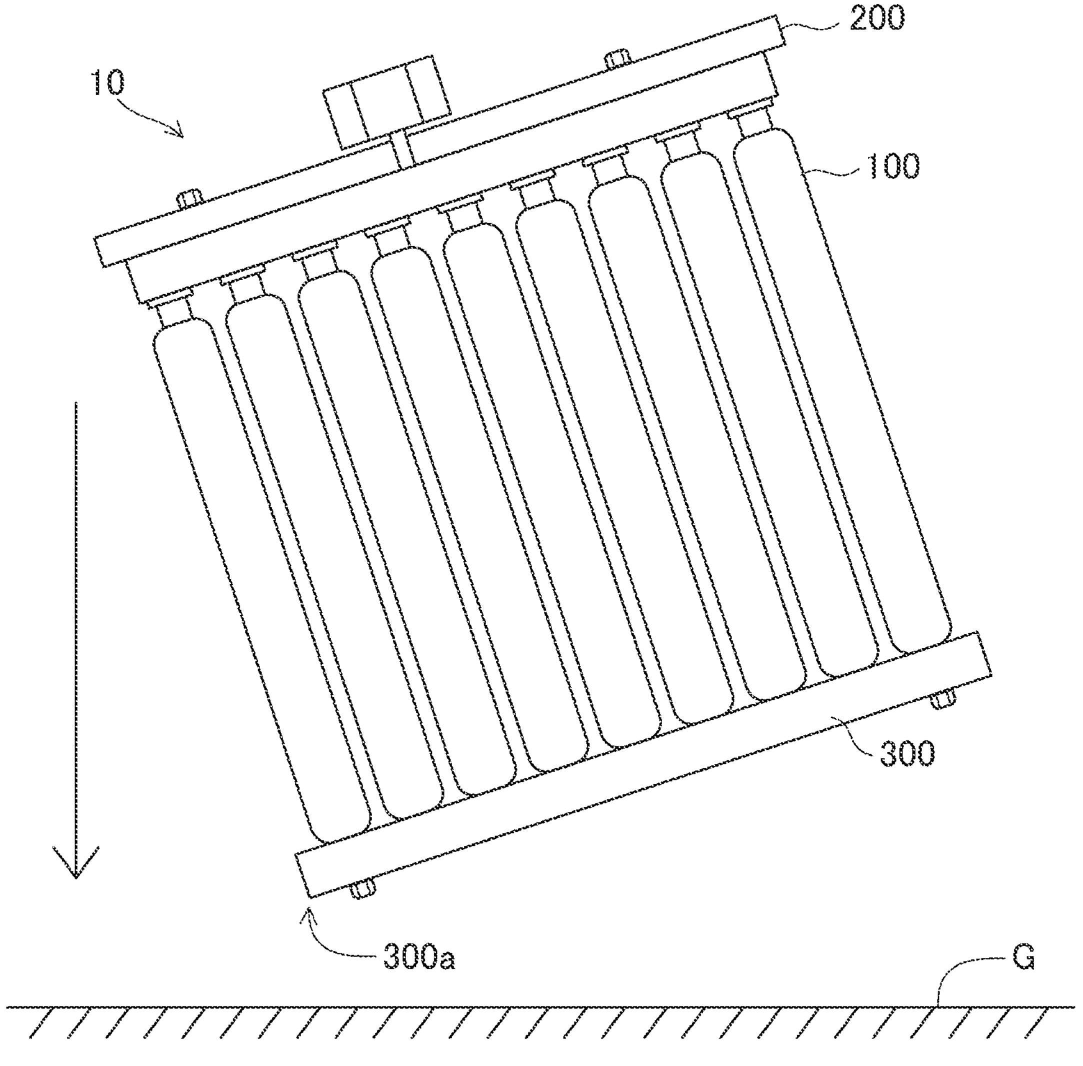
FIG. 13 shows an example of an attitude the tank unit is in when the tank unit drops.

The above features provide the following advantages. No matter what attitude the tank unit 10 is in when the tank unit 10 drops, either the top connector 200 or the bottom connector 300 always first comes into contact with the ground. For example, as shown in FIG. 13, even when the tank unit 10 drops in a tilted attitude, an outer corner 300*a* of the bottom connector 300 first comes into contact with the ground G. The top connector 200 or the bottom connector 300 first comes into contact with the ground when the tank unit 10 drops. The high pressure tanks 100 are therefore protected.

Figure 14:
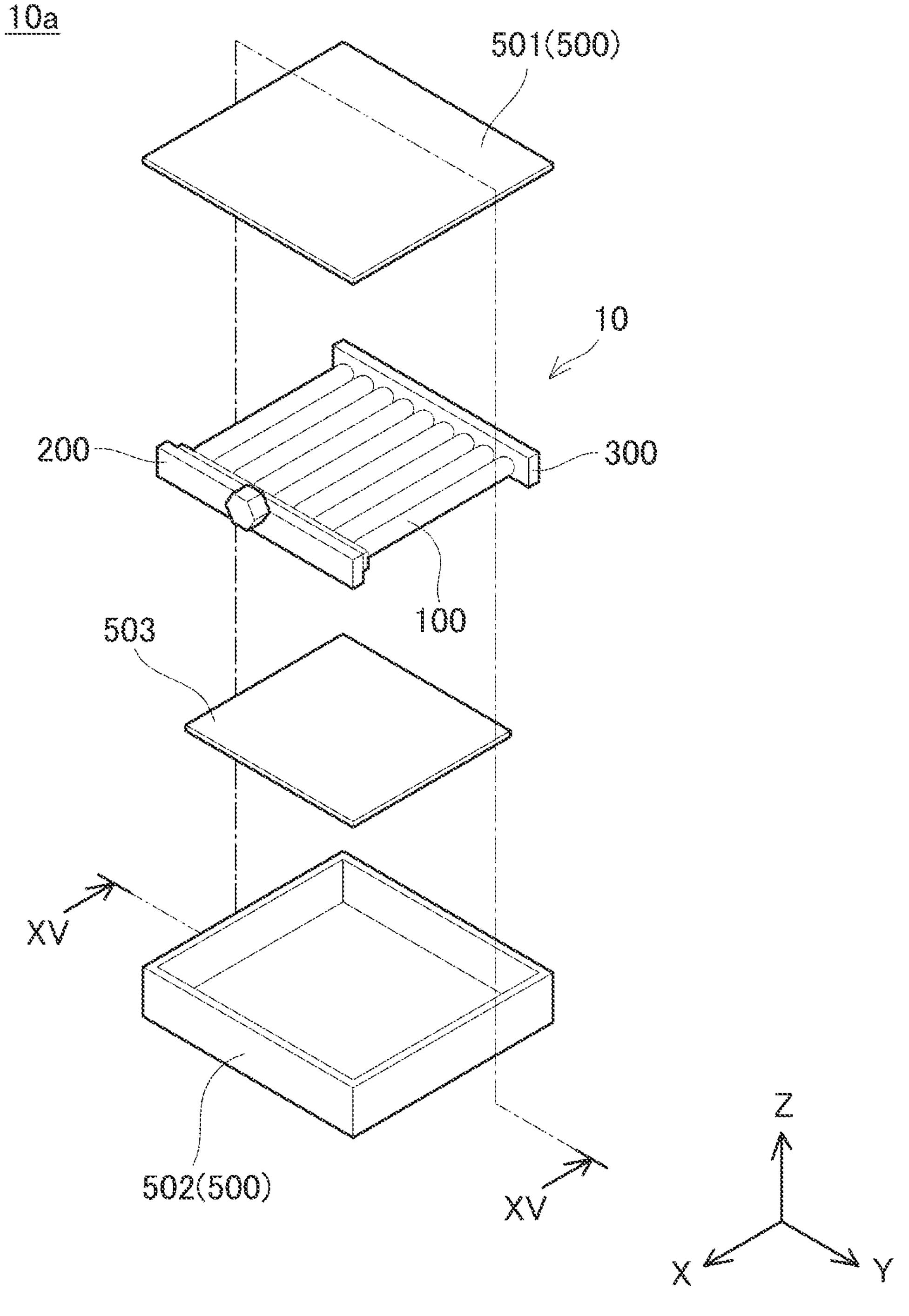
FIG. 14 is an exploded perspective view of a tank unit of a modification.
Figure 15:
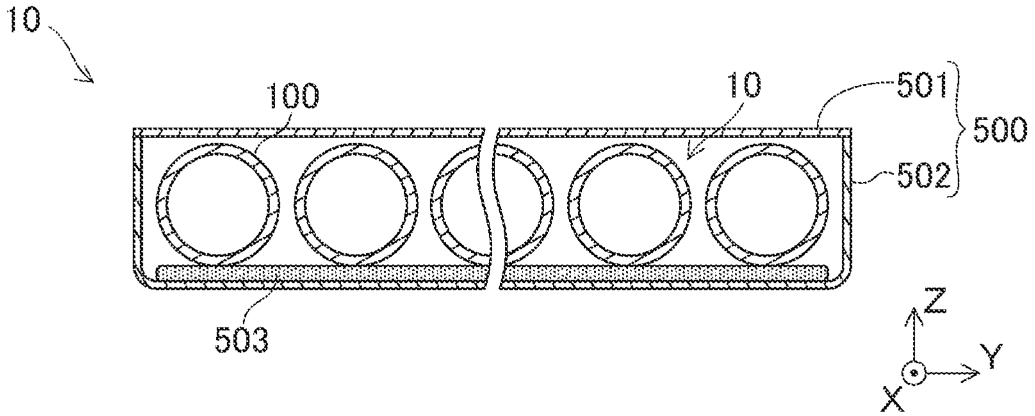
FIG. 15 is a sectional view of the tank unit taken along line XV-XV in FIG. 14.

FIG. 14 is an exploded perspective view of a tank unit 10*a* of a modification. FIG. 15 is a sectional view of the tank unit 10*a* taken along line XV-XV in FIG. 14. The tank unit 10*a* includes the tank unit 10 of the embodiment and a housing 500 that houses the tank unit 10. The tank unit 10 is housed in a lower housing 502. The lower housing 502 is closed by a cover 501. A cushioning material 503 is placed between the high pressure tanks 100 and the inner surface of the lower housing 502. The cushioning material 503 is a soft sheet and is made of, for example, silicone rubber. The housing 500 protects the high pressure tanks 100, and the cushioning material 503 protects the high pressure tanks 100 from vibration.

Method for Manufacturing Tank Unit

A method for manufacturing the tank unit 10 will be described with reference to FIGS. 16 to 20. The method for manufacturing the tank unit 10 includes an inspecting step and a connecting step. The inspecting step is performed before the connecting step. In the inspecting step, a pressure resistance inspection is performed on each of the high pressure tanks 100. In the connecting step, the high pressure tanks having passed the pressure resistance inspection are connected.

Figure 16:
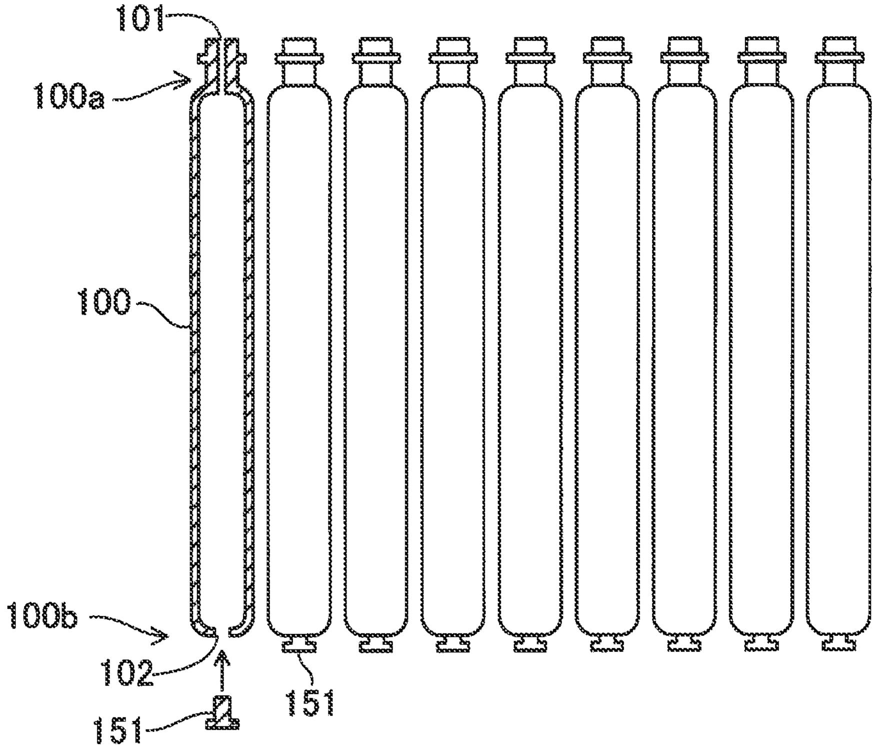
FIG. 16 illustrates a method for manufacturing a tank unit (1)

The inspecting step will be described. FIG. 16 shows high pressure tanks before the inspecting step. Only the leftmost high pressure tank 100 is shown in section. As described above, the high pressure tank 100 has the opening 101 in the top 100*a* and has the opening 102 in the bottom 100*b*. The opening 102 in the bottom 100*b* of each high pressure tank 100 is closed by a plug 151 before the pressure resistance inspection (see FIG. 16).

Figure 17:
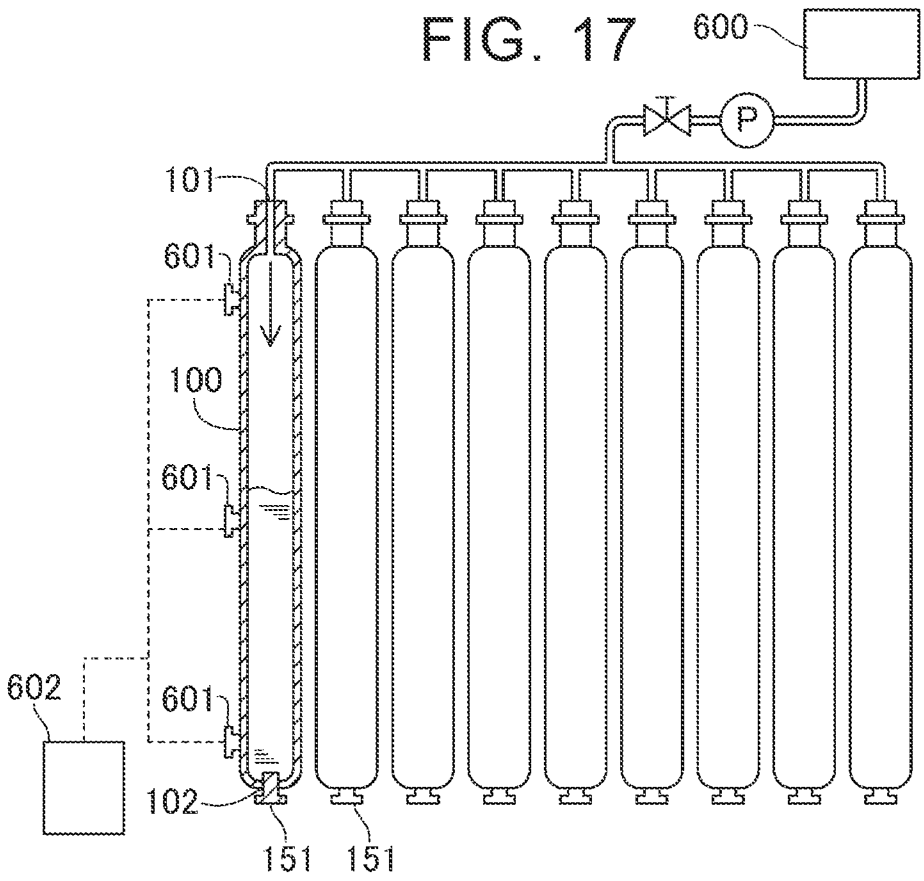
FIG. 17 illustrates the method for manufacturing a tank unit (2)

After the opening 102 in the bottom 100*b* of each high pressure tank 100 is closed by the plug 151, a water injection device 600 is attached to the opening 101 in the top 100*a* of each high pressure tank 100. The water injection device 600 injects high pressure water into each high pressure tank 100. Strain gauges 601 are attached to various parts of the surface of each high-pressure tank 100. In FIG. 17, only one high pressure tank 100 is shown in section and is shown with the strain gauges 601 attached thereto. Strain gauges are also attached to the other high pressure tanks 100.

The strain gauges 601 are electrically connected to an inspection device 602. In the inspecting step, each high pressure tank 100 is filled with water to its full capacity, and a predetermined water pressure is applied to each high pressure tank 100. The inspection device 602 checks whether the surface strain of each high pressure tank 100 filled with water to its full capacity is within a predetermined allowable range. When the surface strain is greater than the allowable range, the inspection device 602 determines that this high pressure tank does not have enough pressure resistance performance, and identifies this high pressure tank as having failed the pressure resistance inspection. The pressure resistance inspection is individually performed for each high pressure tank 100 before connection.

Figure 18:
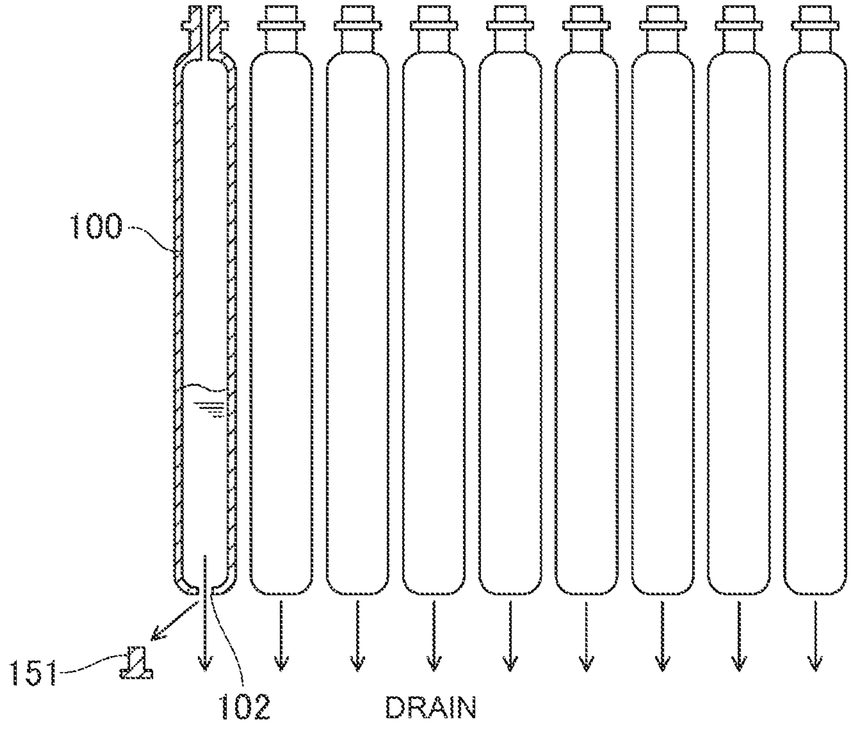
FIG. 18 illustrates the method for manufacturing a tank unit (3)
Figure 19:
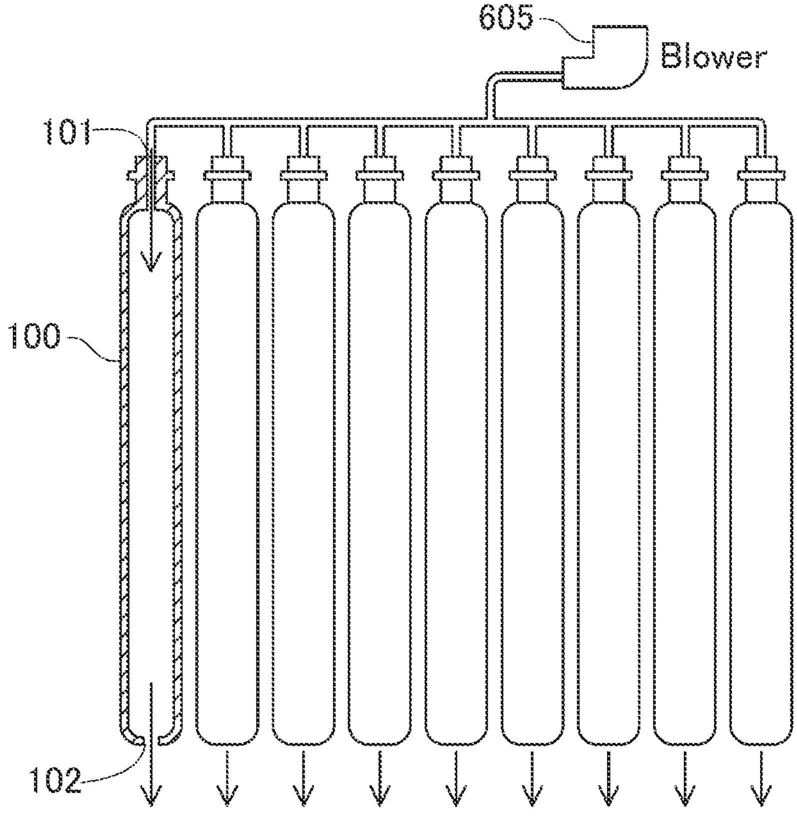
FIG. 19 illustrates the method for manufacturing a tank unit (4)

After the pressure resistance inspection is completed, the plug 151 is removed from the opening 102, and the water in the high pressure tank 100 is drained (FIG. 18). A blower 605 is then connected to the opening 101 in the top 100*a* of each high pressure tank 100. Dry air is blown from the blower 605 into each high pressure tank 100 to dry the inside of each high pressure tank 100 (FIG. 19). The dry air having entered the high pressure tank 100 through the opening 101 in the top 100*a* passes through the inside of the high pressure tank 100 and leaves the high pressure tank 100 through the opening 102 in the bottom 100*b*. The high pressure tank 100 has openings in its top and bottom. Since the dry air can be passed through the inside of the high pressure tank 100 in one direction, the inside of the high pressure tank 100 can be dried quickly.

Figure 20:
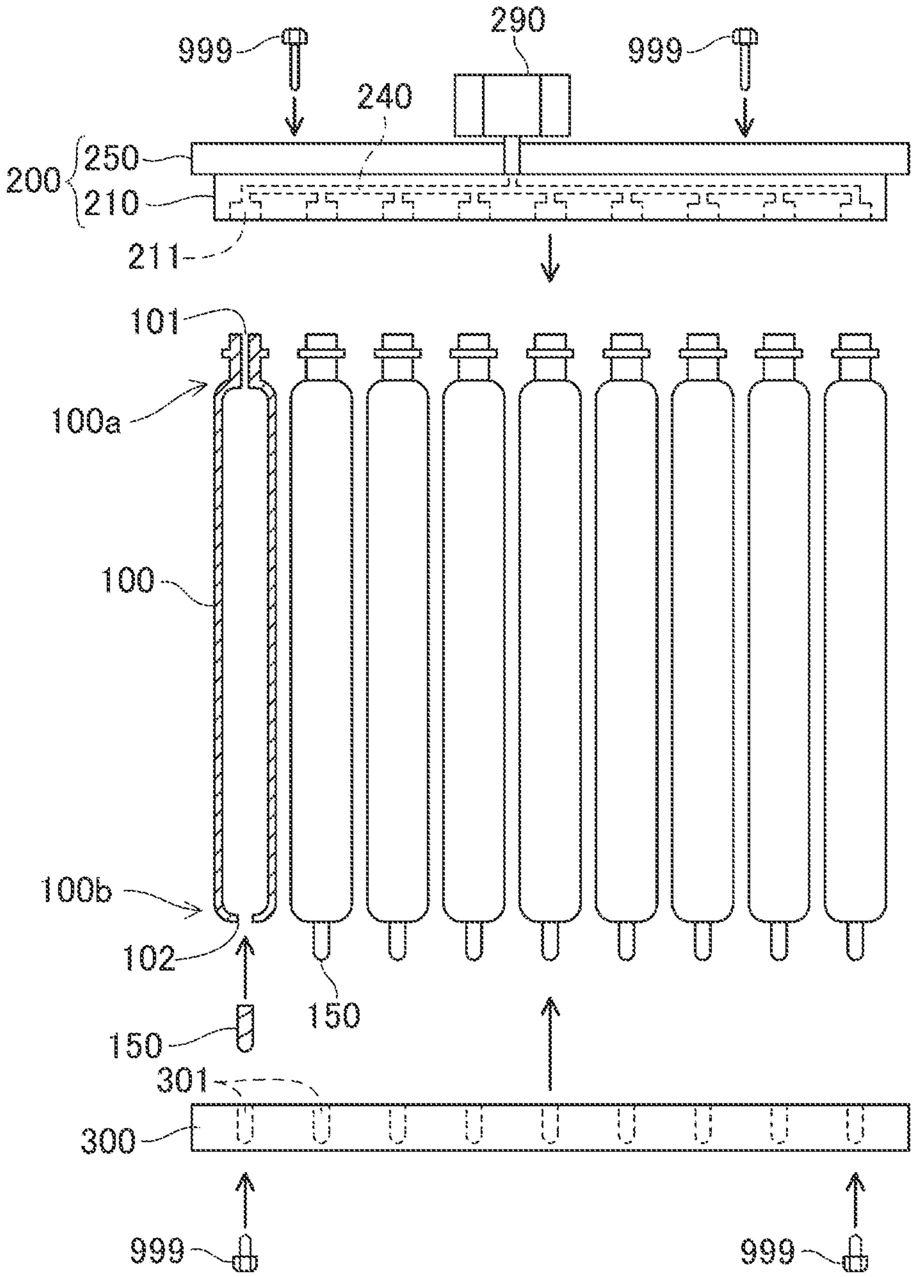
FIG. 20 illustrates the method for manufacturing a tank unit (5).

Subsequently, the connecting step is performed. In the connecting step, the high pressure tanks 100 having passed the pressure resistance inspection are collected. In the connecting step, the end cap 150 is attached to the opening 102 in the bottom 100*b* of each high pressure tank 100 (FIG. 20). The end cap 150 attached to each high pressure tank 100 protrudes outward from the bottom 100*b* of the high pressure tank 100. The high pressure tanks 100 are arranged side by side, and the tips of the end caps 150 are fitted in the bottom connector 300. Two or more bolts 999 are inserted into the bottom connector 300 and fixed to the end caps 150 (FIG. 20). The top connector 200 is fixed to the tops 100*a* of two or more of the high pressure tanks 100 with bolts 999. The high pressure tanks 100 arranged in parallel are connected by the top connector 200 and the bottom connector 300.

The top connector 200 includes the protector 250 and the intake manifold 210. The intake manifold 210 includes the caps 211 that close the openings 101 in the tops 100*a* of the high pressure tanks 100, and the gas flow path 240 that guides the gas in the high pressure tanks 100 to the outside. The gas flow path 240 is thinner than a pipe of the water injection device 600 that injects a liquid into the high pressure tanks 100. Therefore, if water is injected into the high pressure tank 100 for the pressure resistance inspection after the gas flow path 240 is attached to the high pressure tank 100, it takes time to perform the pressure resistance inspection due to large loss in the gas flow path 240. The tank unit can be efficiently manufactured by performing the pressure resistance inspection on the high pressure tanks 100 before attaching the gas flow path 240 to the high pressure tanks 100.

Some of the features of the method for manufacturing the tank unit 10 will be described below. Each high pressure tank 100 has the opening 101 in its top 100*a* and has the opening 102 in its bottom 100*b*. The opening 102 in the bottom 100*b* is sealed with the plug 151 and a liquid is injected through the opening 101 in the top 100*a* into each high pressure tank 100 to perform the pressure resistance inspection. After the plug 151 is removed and the inside of each high pressure tank 100 is dried, the end cap 150 is attached to the opening 102 in the bottom 100*b* of each high pressure tank 100. When drying the inside of the high pressure tank 100, air is blown into the high pressure tank 100 through the opening 101 in the top 100*a* and is let out of the high pressure tank 100 through the opening 102 in the bottom 100*b*. The inside of the high pressure tank 100 can thus be quickly dried. In this respect as well, the tank unit 10 can be efficiently manufactured by the manufacturing method of the embodiment.

The end caps 150 attached to the high pressure tanks 100 are fitted in the bottom connector 300 to connect the high pressure tanks 100. The connecting step includes connecting the tops of the high pressure tanks 100 by the top connector 200. All the high pressure tanks 100 are contained in the smallest rectangular parallelepiped containing the top connector 200 and the bottom connector 300. The top connector 200 and the bottom connector 300 protect the high pressure tanks 100.

Points to be noted regarding the technique described in the embodiment will be described. The number of high pressure tanks included in one tank unit is not limited as long as it is two or more.

The top connector may be provided with a gas flow path that guides the gas in the high pressure tanks to the outside. By providing the gas flow path in the top connector, physical connection of the high pressure tanks and connection of the gas flow path with the high pressure tanks can be performed at the same time.

The tank unit may be structured so that each high pressure tank has an opening in its bottom, the opening is closed by the end cap extending to the outside of the high pressure tank, and the end cap of each high pressure tank is inserted into the bottom connector. The bottom connector can thus be easily attached to the high pressure tanks.

While specific examples of the disclosure are described in detail above, these are merely illustrative, and are not intended to limit the scope of the claims. The technique set forth in the claims includes various modifications and variations of the specific examples illustrated above. The technical elements illustrated in the present specification or the drawings exhibit technical utility alone or in various combinations, and are not limited to the combinations described in the claims as filed. The technique illustrated in the present specification or the drawings can achieve a plurality of objects at the same time, and achieving one of the objects itself has technical utility.

What is claimed is:

1. A method for manufacturing a tank unit, comprising:

performing a pressure resistance inspection on each of a plurality of high pressure tanks before connecting the high pressure tanks; and connecting a gas flow path to the high pressure tanks that have passed the pressure resistance inspection, wherein each of the high pressure tanks has an opening in a top and a bottom of each of the high pressure tanks, the opening in the bottom is sealed with a plug and a liquid is injected through the opening in the top into each of the high pressure tanks to perform the pressure resistance inspection, after the plug is removed and inside of each of the high pressure tanks is dried, an end cap is attached to the opening in the bottom, and the end cap of each of the high pressure tanks is fitted in a bottom connector to connect the high pressure tanks.

2. The method according to claim 1, wherein the tops of the high pressure tanks are connected by a top connector when connecting the gas flow path to the high pressure tanks, and all the high pressure tanks are contained in a smallest rectangular parallelepiped containing the bottom connector and the top connector.

* * * * *